May 16, 1967 W. G. BARRETT ETAL 3,320,410

REGISTER INCLUDING INTER-STAGE MULTIVIBRATOR TEMPORARY STORAGE

Filed June 9, 1964 3 Sheets-Sheet 1

INVENTORS
WILLIAM G. BARRETT
DAVID K. JOHNSON
GALE H. THORNE SR.
BY
S.C. Yeaton
ATTORNEY

REGISTER INCLUDING INTER-STAGE MULTIVIBRATOR TEMPORARY STORAGE

Filed June 9, 1964 3 Sheets-Sheet 2

INVENTORS
WILLIAM G. BARRETT
DAVID K. JOHNSON
GALE H. THORNE SR.
BY
ATTORNEY

REGISTER INCLUDING INTER-STAGE MULTIVIBRATOR TEMPORARY STORAGE

Filed June 9, 1964 3 Sheets-Sheet 3

INVENTORS
WILLIAM G. BARRETT
DAVID K. JOHNSON
GALE H. THORNE SR.
BY S. C. Yeaton
ATTORNEY United States Patent Office 3,320,410
Patented May 16, 1967

3,320,410
REGISTER INCLUDING INTER-STAGE MULTI-VIBRATOR TEMPORARY STORAGE

William G. Barrett, Bountiful, and David K. Johnson and Gale H. Thorne, Sr., Salt Lake City, Utah, assignors to Sperry Rand Corporation, Great Neck, N.Y., a corporation of Delaware Filed June 9, 1964, Ser. No. 373,682
9 Claims. (Cl. 235—175)

Figure 1:
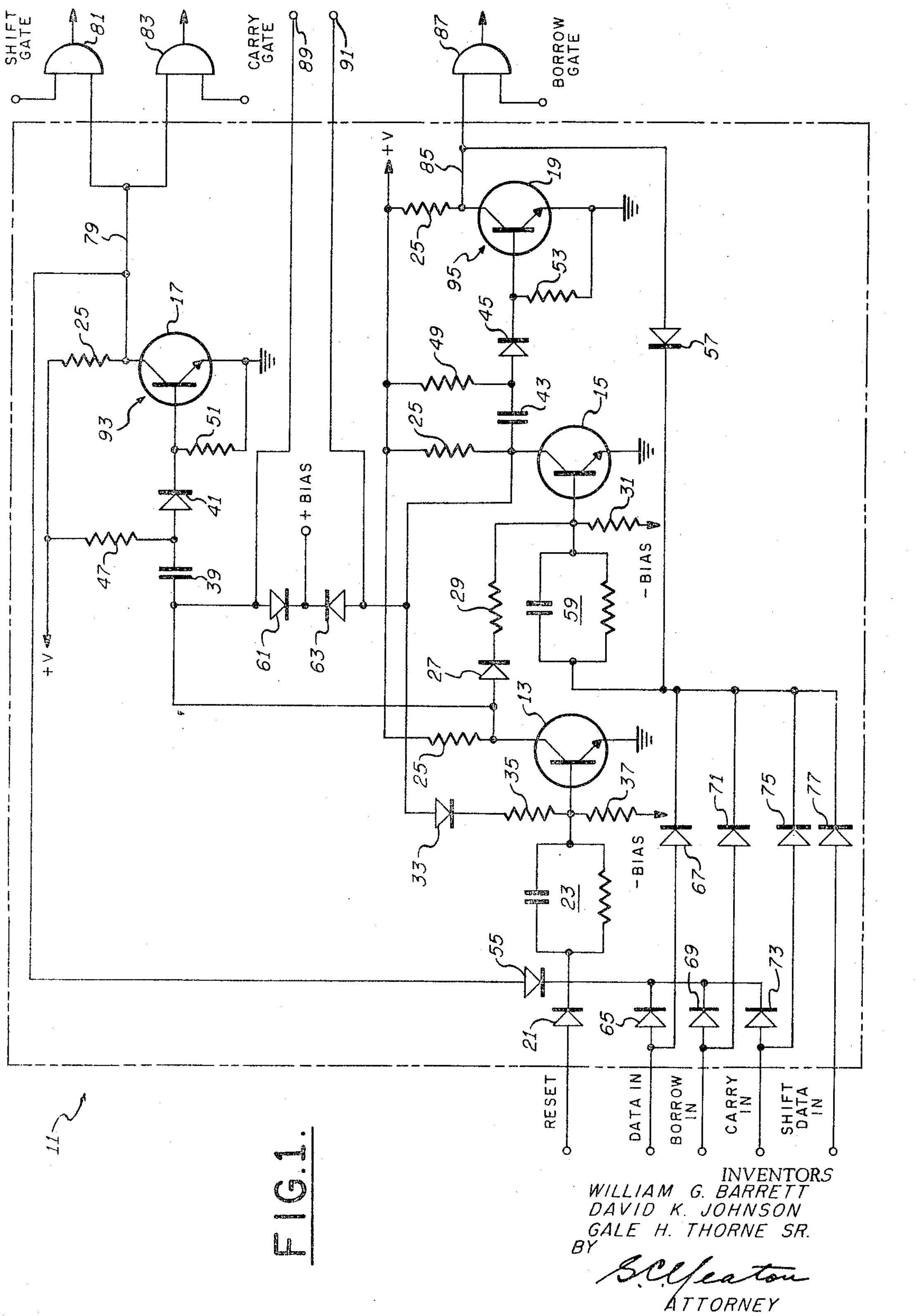

This invention relates to a multistable circuit and more particularly to a standardized multistable register circuit that can be used to perform a variety of functions in a digital computer.

Digital computers employ large numbers of individual subassemblies. Because of this, computers are bulky and expensive and require complex wiring. Many subassemblies in such computers are used only intermittently while data are being processed since such subassemblies can perform only one logic function in the process.

Furthermore, such subassemblies are difficult to fabricate and thus relatively expensive since a different type of unit must be used for each function to be performed.

It is an object of the present invention to provide a basic subassembly that can be used to perform a variety of logic operations in a digital computer.

It is another object of the present invention to provide a register containing a minimum number of parts.

It is still another object of the present invention to provide a register that can be selectively switched to function as a shift register, parallel adder, parallel subtractor or counter.

These and other objects are achieved according to the principles of the present invention by providing a basic circuit in the form of a modified flip-flop in which shift, carry, or borrow information can be retained for a short time after the state of the flip-flop has been reversed.

Further objects and advantages will be apparent from the following description and the accompanying drawings.

Figure 2:
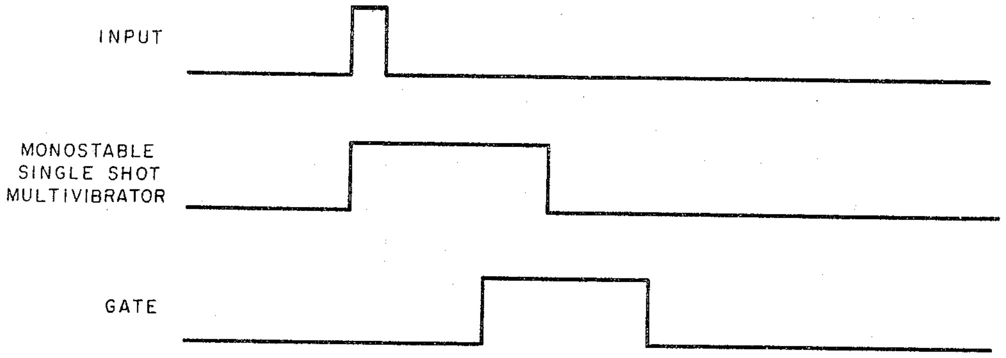
Figure 3:
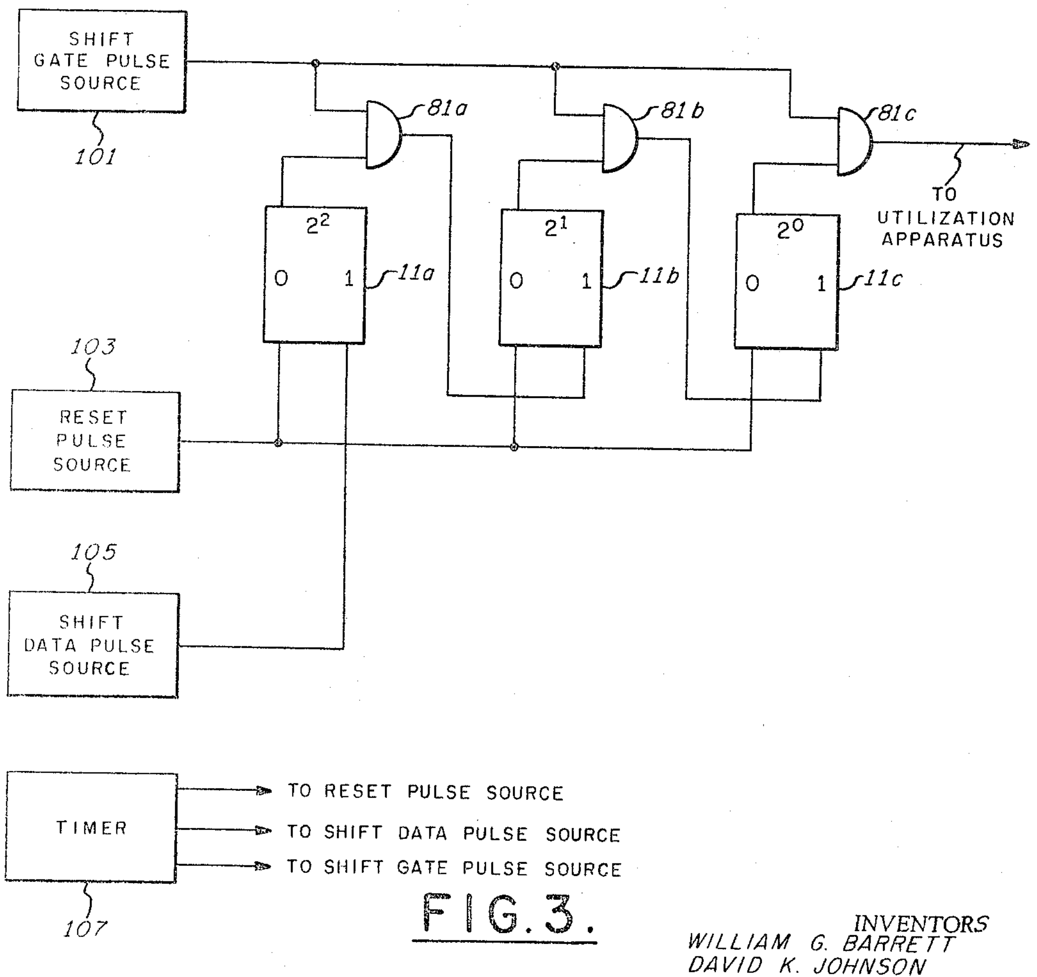
Figure 4:
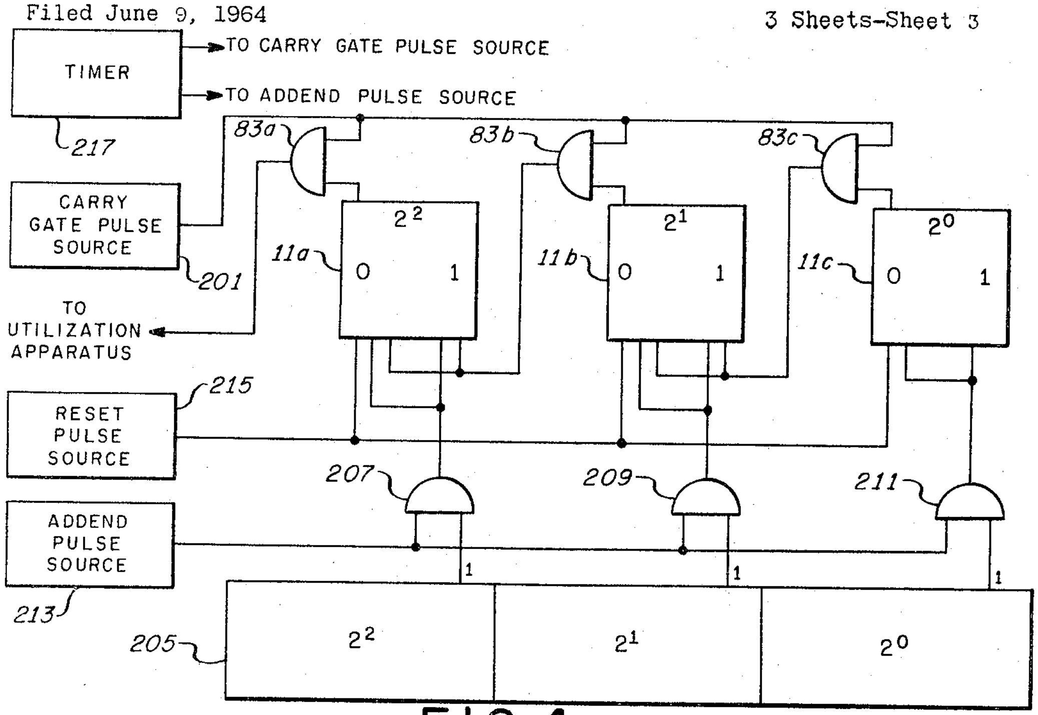
Figure 5:
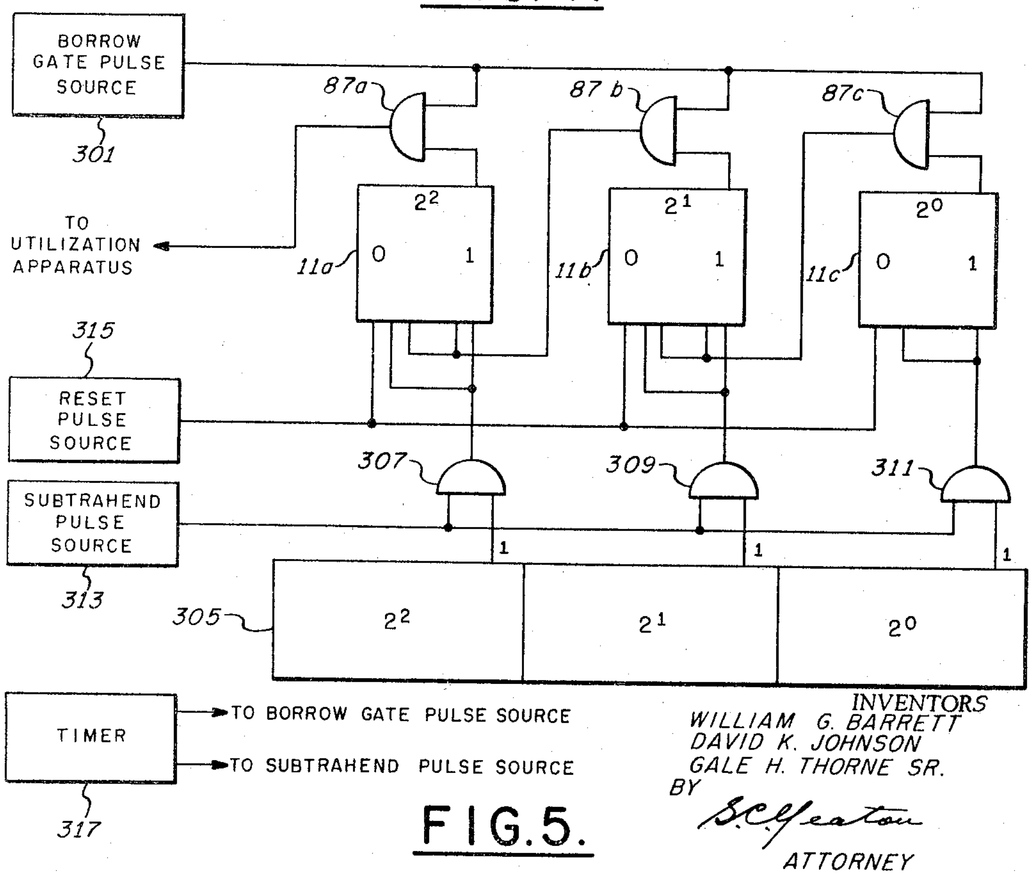

In the drawings:

FIG. 1 is a diagram illustrating a single stage of such a basic circuit employing the principles of the invention, FIG. 2 is a diagram illustrating certain wave shapes of voltage employed in the circuit of FIG. 1, FIG. 3 is a block diagram illustrating the use of the circuit of FIG. 1 in a shift register, FIG. 4 is a block diagram illustrating the use of the circuit of FIG. 1 in a full adder, and FIG. 5 is a block diagram illustrating the use of the circuit of FIG. 1 in a full subtractor.

Referring now to FIG. 1, a single stage of a universal register 11 includes a flip-flop comprising first and second flip-flop transistors 13 and 15 and their associated circuits.

The flip-flop is considered to be in the binary ONE state when only the transistor 15 is conducting and in the binary ZERO state when only the transistor 13 is conducting.

First and second pulse forming transistors 17 and 19 are coupled to the flip-flop transistors 13 and 15 respectively.

Positive-going reset pulses are applied to the base of the transistor 13 through a diode 21, and a resistance-capacitance network 23. Reset pulses applied through these elements cause the transistor 13 to saturate and to set the flip-flop to the binary ZERO state.

The transistors as presently preferred are all of the NPN type connected in a grounded emitter circuit. The collector elements of these transistors are connected to a suitable positive voltage source through the individual collector resistors 25. This voltage may typically be in the order of 15 volts.

The collector of the transistor 13 is connected to the base of the transistor 15 through a coupling diode 27 and a coupling resistor 29. The base of the transistor 15 is also connected to a suitable source of negative bias through a biasing resistor 31. This bias voltage may typically be in the order of —3 volts.

The resistors 29 and 31 are proportioned to bias the transistor 15 to saturation when the transistor 13 is cut off.

The collector of the transistor 15 is also connected to the base of the transistor 13 through a coupling diode 33 and a coupling resistor 35.

The base element of the transistor 13 is also connected to the negative bias voltage through a biasing resistor 37. The resistors 35 and 37 are proportioned to bias the transistor 13 to saturation when the transistor 15 is cut off.

The collector of the transistor 13 is also coupled to the base of the transistor 17 through a coupling capacitor 39 and a coupling diode 41.

Similarly, the collector of the transistor 15 is coupled to the base of the transistor 19 through a coupling capacitor 43 and a coupling diode 45.

The bases of the transistors 17 and 19 are connected to the positive voltage source through the resistors 47 and 49 respectively. These resistors serve to maintain the transistors 17 and 19 in a normally saturated state. The resistors 51 and 53 further serve to discharge the base-to-emitter capacitance of the transistors so as to increase the switching rate of these elements.

The collector voltage of the transistor 17 is fed back to the base of the transistor 13 through a diode 55 and the resistance-capacitance network 23.

Similarly, the collector voltage of the transistor 19 is fed back to the base of the transistor 15 through a diode 57 and a resistance-capacitance network 59.

The collectors of the transistors 13 and 15 are further connected to a source of positive bias, typically in the order of 3 volts, through the clamping diodes 61 and 63 respectively. These diodes serve to clamp the outputs of the flip-flop transistors and to prevent overshoot when either of these transistors is driven out of the saturated state. Such overshooting would cause misfiring of the pulse forming transistors 17 and 19.

The state of the flip-flop may be switched from either binary state to the other by applying a positive-going data, borrow, or carry input pulse to the flip-flop transistors.

Data input pulses are coupled to the base elements of the flip-flop transistors through the diodes 65 and 67. Borrow input pulses are coupled to these transistors through the diodes 69 and 71 whereas carry input pulses are coupled to these transistors through the diodes 73 and 75.

Shift data input pulses may be applied to the flip-flop transistor 15 through a diode 77, thus causing the transistor 15 to saturate and switching the flip-flop to the binary ONE state.

The output of the pulse forming transistor 17 appears on a line 79. This may be gated to utilization apparatus through a shift AND gate 81 or a carry AND gate 83. Either of these gates will produce an output signal when positive voltages appear on both of the input terminals of the gate.

The output of the pulse forming transistor 19 appears on a line 85. This may be gated to utilization apparatus through a borrow AND gate 87. This gate provides an output signal when positive voltages are applied to both of its input terminals.

A first output terminal 89 is connected to the collector element of the flip-flop transistor 13 and a second output terminal 91 is connected to the collector element of the flip-flop transistor 15. These terminals may be used to provide voltages indicative of the binary state of the flip-flop.

The pulse forming transistor 17 and its associated circuit elements comprise a first monostable multivibrator 93. This may conveniently be referred to as a "Q" multivibrator. Whenever the flip-flop transistor 13 is driven from cut off to saturation, a negative-going pulse is applied to the input of the transistor 17. This cuts off the transistor 17 and drives the monostable multivibrator to its quasi-stable state for a specific time depending upon the resistance-capacitance parameters in the multivibrator circuit. The quasi-stable pulse duration of such multivibrator circuits can be adjusted within wide limits according to well-known techniques. While the transistor 17 is cut off, a positive voltage is applied to the output line 79. The multivibrator circuit 93 is proportioned to provide an output pulse having a duration longer than the duration of the input pulses which will be applied to the flip-flop transistors.

Similarly, the pulse forming transistor 19 and its associated circuit elements comprise a second monostable multivibrator 95. This may conveniently be referred to as a "Q-NOT" multivibrator. Whenever the transistor 15 is driven from cut off to saturation, the transistor 19 is driven to cut off for a specific time, thus producing an output signal on the line 85. The multivibrator 95 is proportioned to produce a pulse having a duration equal to that of the multivibrator 93.

Thus when the flip-flop is switched out of the binary ONE state, the transistor 13 is driven to saturation, causing a pulse to appear and remain at the output of the Q multivibrator 93 for a specified time thereafter. Similarly, when the flip-flop is switched out of the binary ZERO state, the transistor 15 is driven to saturation and a pulse remains at the output of the Q-NOT multivibrator 95 for a specified time thereafter.

The operation of the circuit of FIG. 1 may be understood by assuming that the flip-flop transistor 15 is saturated and the transistor 13 is cut off. When a pluse of sufficient magnitude occurs on either the data, borrow, or carry input lines, the transistor 13 is driven to saturation and the transistor 15 is held in saturation. The input pulse holds the transistor 13 in saturation until the output of the Q multivibrator 93 is of sufficient magnitude to hold the transistor 13 in saturation. When the input pulse terminates, the transistor 15 comes out of saturation. The transistor 13 cannot come out of saturation because it is still being driven by the longer duration pulse from the actuated multivibrator 93. By the time that the output pulse from the multivibrator 93 terminates, the transistor 15 is completely cut off and the voltage at the base of the transistor 13 is of sufficient magnitude to hold this transistor in saturation. The flip-flop has now changed states. Another pulse on any of the input lines would cause the transistor 15 to saturate and the transistor 13 to cut off in a similar manner.

After the end of the input pulse, the monostable pulse width must exist for a period long enough to hold the side of the flip-flop that it is driving in saturation while the other side comes out of saturation and while the collector capacitance charges. That is, the quasi-stable pulse duration must exceed the settling time of the flip-flop.

This relationship can be visualized by referring to FIG. 2 of the drawings. An input pulse is applied to the circuit as shown in the drawing. This causes the appropriate monostable multivibrator to initiate a pulse of longer duration than the input pulse. During the time that the monostable multivibrator pulse is being produced, a gate pulse may be applied to an appropriate output gate in order to obtain an output signal from the circuit. In a typical application, the input pulse may have a duration of 1 microsecond. The single shot multivibrator pulse may have a duration of 6 microseconds. The duration of the gate pulse is determined by the propagation time of the overall register configuration but is typically in the order of 5 microseconds. The gate pulse preferably must be delayed so that it does not begin for approximately 1.5 microseconds after the termination of the input pulse in order to allow the flip-flop to complete its change-of-state.

The function of the monostable multivibrators is to faciliate the triggering action as previously described, but more importantly to serve as short duration auxiliary storage elements. A signal indicative of the condition or state of the flip-flop prior to the input pulse is stored in one of these multivibrators. If there had been a ONE in the flip-flop prior to the input pulse, this information is stored in the Q multivibrator for the duration of the output pulse of this element; if there had been a ZERO in the flip-flop, this information is stored for a few microseconds in the Q-NOT multivibrator.

It is this temporary storage that makes additions, subtractions, or shifts possible in a single register.

It should be noted that whenever either flip-flop transistor is driven to saturation, it is regeneratively clamped in that state for a definite time by the output of a monostable multivibrator. This provides exceptional stability and reliability of operation.

FIG. 3 shows the interconnection necessary between three universal stages for shifting data to the right. The connections for carry and borrow are not used in the shift register configuration. Stage 11*a* of FIG. 3 represents a $2^2$ element, stage 11*b* represents the $2^1$ element and stage 11*c* represents the $2^0$ element. Shift AND gates 81*a*, 81*b*, and 81*c*, each equivalent to the shift gate 81 of FIG. 1, are connected to receive pulses from a shift gate pulse source 101 and from the Q multivibrators in the individual stages. A reset pulse source 103 is connected to set the flip-flop in each stage to the binary ZERO state through reset lines as pictured in FIG. 1. New information is supplied from a shift data pulse source 105. This is connected to set the flip-flop in stage 11*a* to the binary ONE state through a shift data input line as shown in FIG. 1. A timer 107 may be used to trigger the various pulse sources in the proper sequence. The shift gate pulse source is triggered so that the shift gate pulse occurs after the flip-flop has settled in a switched state, but before the termination of the quasi-stable period of the multivibrators.

The operation of this circuit can be understood by assuming that a binary number 101 is to be injected into the register. The operation is initiated by applying a reset pulse from the source 103. This clears the register. The data is introduced into the first stage 11*a* by means of a shift data pulse from the source 105. This switches the flip-flop in stage 11*a* to the binary ONE state, but does not affect stage 11*b* or 11*c*. The register is now in the 100 state. A reset pulse is then applied from the source 103, setting the flip-flop in each stage to the ZERO state. Since the flip-flop in stage 11*a* was switched from the binary ONE to the binary ZERO state by this reset pulse, the Q monostable multivibrator associated with this stage will be actuated during this switching function. The output from this multivibrator will remain after the stage 11*a* has been switched. A shift gate pulse from the source 101 is then applied while an output voltage is still being developed by this multivibrator. This permits the gate 81*a* to pass a pulse to the stage 11*b* so as to switch the flip-flop in stage 11*b* to the binary ONE state. The register will now be in the 010 state. The second digit of the binary number to be injected into the register is a ZERO. Injection of this digit leaves the register unaffected. A reset pulse is next applied, causing the flip-flop in all stages to reside in the binary ZERO state, and actuating the Q monostable multivibrator in the 11*b* stage. The following gate pulse will transfer the information temporarily stored in this multivibrator to stage 11*c*, leaving the register in the 001 state. Finally, a binary ONE is introduced into the register from the source 105. The register now contains the entire number 101. The output from the gate 81c can be used to actuate external utilization apparatus or more universal register stages if so desired.

It will be appreciated that the device may be used to shift left or right or to count up or down by modifying the interconnections between stages.

FIG. 4 illustrates the interconnection between three universal register stages 11a, 11b, and 11c, used as an accumulator for adding numbers stored as an addend in an external register 205. The external register may be associated with a conventional computer, for instance, and may contain three flip-flops designated as the $2^2$, $2^1$, and $2^0$ stages respectively. AND gates 207, 209, and 211 are used to read data out of any of these external register stages that happen to be in the binary ONE state when an addend pulse is supplied by the addend pulse source 213.

The universal register may be cleared by means of a pulse from a reset pulse source 215. This source applies pulses to the binary ZERO input terminals of the flip-flop in each stage through a reset terminal as pictured in FIG. 1.

Original information may be gated into the universal register stages through the external register 205, through independent means, or serially through connections as described with respect to the shift register.

The universal register stages, each equivalent to the stage 11 of FIG. 1, are arranged to receive addend information from the appropriate external AND gates 207, 209, and 211. The information from these gates is supplied to the data input terminals and the universal register stages.

Carry AND gates 83a, 83b, and 83c, each equivalent to the carry gate 83 of FIG. 1, are connected to receive pulses from the carry gate pulse source 201. Gate 83c is connected to pass pulses to the carry input terminal of the stage 11b. Carry gate 83b is connected to pass pulses to the carry input terminal of the stage 11a. Carry gate 83a may be connected to higher valued stages or to other utilization apparatus as desired.

The operation of this circuit may be understood by assuming that the universal register stages contain the binary number 001, and that the external register 205 contains the binary number 011. These numbers can be added by first applying an addend pulse from the source 213. This will permit a switching pulse to pass from the $2^0$ stage of the external register 205 so as to switch stage 11c. Another pulse will be passed from the $2^1$ stage of the register 205 so as to switch stage 11b. Since the $2^2$ stage of the register 205 is in the binary ZERO stage, no pulse is passed through the gate 207. Since the flip-flop in stage 11c was originally in the binary ONE state, the pulse from the gate 211 caused the flip-flop in this stage to switch to the binary ZERO state and thus to actuate the Q monostable multivibrator in this stage. At this time the universal register contained the binary number 010, and the Q multivibrator in the stage 11c was actuated. A carry gate pulse is next applied from the source 201. This permits a pulse to flow from the gate 83c to the stage 11b which switches the flip-flop in stage 11b to the ZERO state and actuates the Q multivibrator in this stage. The carry gate pulse, however, is still being applied and this permits a switching signal to pass to stage 11a. This causes the flip-flop in stage 11a to switch to the binary ONE state. The universal register now contains the binary number 100 which is the sum of the numbers originally stored in the universal register and in the external register.

A timer 217 may be used to trigger the carry and addend pulse sources. The timer provides a delay between the termination of the addend pulse and the inception of the carry gate pulse which is longer than the settling time of the flip-flop but shorter than the duration of the quasi-stable state of the multivibrators.

The carry gate pulse must have sufficient duration to permit the carry signal to propagate through all of the universal register stages.

FIG. 5 illustrates the interconnections necessary between three universal register circuits 11a, 11b, and 11c, for subtracting a subtrahend stored in an external register 305 from a minuend stored in the universal register. The external register again contains three stages for purpose of illustration. AND gates 307, 309, and 311 are connected to the binary ONE output terminals of each stage of this external register. These gates are also connected to receive a pulse from the subtrahend pulse source 313, so that a pulse from this source will permit a signal to pass through any of these gates that happen to be connected to a stage in the register 305 that is in the binary ONE state. Pulses from these gates are passed to the data input terminals in the corresponding stages in the universal register.

Minuend information may be introduced into the universal register through the external register 305, through an independent parallel source, or serially through the shift register connections previously described.

Borrow gates 87a, 87b, and 87c, each equivalent to the borrow gate 87 of FIG. 1, are used during the subtraction process. These gates are connected to receive pulses from the Q-NOT multivibrators and from the borrow gate pulse source 301.

The gate 87c will pass a borrow pulse to the borrow input terminals of stage 11b when the Q-NOT multivibrator in stage 11c and the borrow gate pulse source produce concurrent pulses. Similarly, the gate 87b will pass a borrow pulse to the borrow input terminals of the stage 11a whenever the Q-NOT multivibrator in stage 11b is actuated and a pulse is supplied from the source 301. The gate 87a may be used to pass similar pulses to higher valued stages or other utilization apparatus if desired.

It can be seen that the subtract function is similar to the add function with the exception that the Q-NOT multivibrator in the various stages is used for subtraction, whereas the Q multivibrator is used for addition.

A timer 317 may be used to trigger the borrow and subtrahend pulse sources. The timer must provide an interval between the termination of the subtrahend pulse and the inception of the borrow pulse which is longer than the settling time of the flip-flop but shorter than the quasi-stable state duration of the multivibrators.

The borrow gate pulse must be sufficiently long to permit a borrow pulse to propagate through all of the stages of the universal register.

Assume that the binary number 101 is stored in the universal register and that the number 010 is stored in the register 305. This latter number can be subtracted from the number in the universal register by first applying a subtrahend pulse from the source 313. This will cause a switching pulse to pass through the gate 309 since the flip-flop in the corresponding stage in the register 305 is in the binary ONE state.

This pulse switches the flip-flop in the stage 11b to the binary ONE state and actuates the Q-NOT multivibrator in that stage. The universal register is now in the 111 state and a pulse is being supplied by the Q-NOT multivibrator in the stage 11b.

A borrow gate pulse is next supplied from the source 301. This permits a pulse from the gate 87b to switch the flip-flop in the stage 11a to the binary ZERO state.

The universal register is now in the 011 state which represents the difference between the two binary numbers originally stored in the registers.

The use of the universal register circuits have been described as separate shift registers, parallel adders, and parallel subtractors. It will be realized, however, that any or all of these functions might be combined so that one set of universal register stages might be switched from one application to the other as desired. Thus in a given computer, a single universal register might be used part of the time for each function.

Although the circuits have been described as employing NPN transistors, it will be appreciated that any suitable electron discharge device may be used in place of these particular transistors.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A register stage comprising a bistable flip-flop; a binary ZERO input means on said flip-flop; a binary ONE input means on said flip-flop; means to couple each data input pulse simultaneously to both of said input means; means for temporarily storing a binary ONE for a specified period of time after the flip-flop has been switched from a binary ONE state; means for temporarily storing a binary ZERO for a specified period of time after the flip-flop has been switched from a binary ZERO state; means for clamping the flip-flop in the binary ZERO state in response to a temporarily stored binary ONE; means for clamping the flip-flop in the binary ONE state in response to a temporarily stored binary ZERO; and gating means to supply output signals from the temporary storage means.

2. A register stage comprising a bistable flip-flop; first and second electron discharge devices in said flip-flop; first and second multivibrators coupled to said first and second electron discharge devices respectively so as to be switched to the quasi-stable state when the associated electron discharge device is rendered conductive, said multivibrators being constructed to remain in the quasi-stable state for a time longer than the settling time of the flip-flop; means to bias the first electron discharge device to saturation while the first multivibrator is in the quasi-stable state; means to bias the second electron discharge device to saturation while the second multivibrator is in the quasi-stable state; and first and second gating means connected to said first and second multivibrators respectively so as to permit output signals to be passed whenever the associated multivibrator is in the quasi-stable state.

3. A register stage comprising a bistable flip-flop; a binary ZERO input means on said flip-flop; a binary ONE input means on said flip-flop; means to couple each data input pulse simultaneously to both of said input means; a first multivibrator coupled to receive a trigger pulse when the flip-flop is switched to the binary ZERO state; a second multivibrator coupled to receive a trigger pulse when the flip-flop is switched to the binary ONE state, said multivibrators being constructed to remain in the quasi-stable state for a time longer than the duration of the data input pulse to be used; means to couple the outputs of said first and second multivibrators to said binary ZERO and said binary ONE input means respectively; and gating means to supply output signals indicative of the state of said multivibrators.

4. A register stage comprising a binary flip-flop; first and second flip-flop input means to couple input signals to the first and second sides of said flip-flop respectively; means to couple input switching pulses simultaneously to both of said flip-flop input means; means to produce a first elongated pulse when the flip-flop is switched out of the binary ONE state; means to produce a second elongated pulse when the flip-flop is switched out of the binary ZERO state; means responsive to said first elongated pulse to hold the flip-flop in the binary ZERO state for the duration of this pulse; and means responsive to said second elongated pulse to hold the flip-flop in the binary ONE state for the duration of this pulse, said elongated pulses having a duration longer than the duration of the input switching pulses to be used.

5. A register stage comprising a bistable flip-flop; a binary ONE and a binary ZERO input means on said flip-flop; a first monostable multivibrator coupled to said flip-flop so as to be triggered in response to the flip-flop being switched to the binary ZERO state; a second monostable multivibrator coupled to said flip-flop so as to be triggered in response to the flip-flop being switched to the binary ONE state; means to couple each data input pulse simultaneously to both input means of the flip-flop; said monostable multivibrators each having a quasi-stable pulse duration longer than the duration of the input data pulse to be used; means to couple the output of said first multivibrator to the binary ZERO input means of said flip-flop; and means to couple the output of said second multivibrator to the binary ONE input means of the flip-flop.

6. A register comprising a binary flip-flop; first and second electron discharge devices in said flip-flop; means to drive both electron discharge devices to saturation in response to each data input pulse; means to produce a first elongated pulse in response to said first electron discharge device being switched from cut-off to saturation; means to produce a second elongated pulse in response to said second electron discharge device being switched from cut-off to saturation; said first and second elongated pulses each having a duration longer than the data input pulse to be used; means to hold said first electron discharge device in saturation for the duration of said first elongated pulse; and means to hold said second electron discharge device in saturation for the duration of said second elongated pulse.

7. A shift register comprising:

(a) a plurality of register stages, each stage including:
   (1) a bistable flip-flop,
   (2) a binary ZERO input means and a binary ONE input means in said flip-flop,
   (3) means for temporarily storing the information originally contained in the register stage for a specified period after the stage of the flip-flop has been reversed, and
   (4) means responsive to said temporarily stored information for holding the flip-flop in its reversed state,
(b) individual gating means to supply output signals indicative of binary ONE information stored in each temporary storage means,
(c) a source of shift gate pulses coupled to the input of each gating means,
(d) a source of reset pulses coupled to the binary ZERO input means of the flip-flop in each stage,
(e) a source of shift data pulses coupled to the binary ONE input means of the first of said register stages, and
(f) means coupling the output of the gating means in each register stage to the binary ONE input means of the succeeding stage.

8. An accumulator for use with an external register comprising:

(a) an internal register stage for each stage in the external register, each internal register stage including:
   (1) a bistable flip-flop,
   (2) a binary ONE input means and a binary ZERO input means on said flip-flop,
   (3) data input means coupled to the binary ONE input means and to the binary ZERO input means,
   (4) carry input means coupled to the binary ONE input means and to the binary ZERO input means,
   (5) reset input means coupled to the binary ZERO input means,
   (6) means for temporarily storing the information originally contained in the register stage for a predetermined time interval after the state of the flip-flop has been reversed, and (7) means responsive to said temporarily stored information for holding the flip-flop in its reversed state, (b) individual gating means to supply output signals indicative of binary ONE information stored in each temporary storage means, (c) individual AND gates connected to pass information from an external register stage in the binary ONE state to the data input means of the corresponding internal register stage, (d) an addend pulse source coupled to the input of each of said AND gates, (e) a reset pulse source coupled to the reset input means in each flip-flop, (f) a carry gate pulse source coupled to the input of each of said gating means, (g) means to couple the output of a gating means to the carry input means of the adjacent internal register stage of higher order, and (h) timing means to actuate the addend pulse source and then the carry gate pulse source, said timing means providing an interval between these pulses which is greater than the settling time of the flip-flop but less than the predetermined time interval of the temporary storage means.

9. A binary full subtractor comprising:

(a) an external register for storing a subtrahend, (b) an internal register having the same number of stages as the external register, each internal register stage including:

(1) a bistable flip-flop, (2) a binary ONE input means and a binary ZERO input means on said flip-flop, (3) data input means coupled to the binary ONE input means and to the binary ZERO input means, (4) borrow input means coupled to the binary ONE input means and to the binary ZERO input means, (5) reset means coupled to the binary ZERO input means, (6) means for temporarily storing the information originally contained in the internal register stage for a predetermined time interval after the state of the flip-flop has been reversed, and (7) means responsive to said temporarily stored information for holding the flip-flop in its reversed state, (c) individual gating means to supply output signals indicative of binary ZERO information stored in each temporaary storage means, (d) individual AND gates connected to pass information from an external register stage in the binary ONE state to the data input means of the corresponding internal register stage, (e) a subtrahend pulse source coupled to the input of each of said AND gates, (f) a reset pulse source coupled to the reset input means in each flip-flop, (g) a borrow gate pulse source coupled to the input of each of said gating means, (h) means to couple the output of each gating means to the borrow input means of the adjacent internal register stage of higher order, and (i) timing means to actuate the subtrahend pulse source and then the borrow gate source, said timing means providing an interval between these pulses that exceeds the settling time of the flip-flop but is less than the predetermined time interval of the temporary storage means.

References Cited by the Examiner

UNITED STATES PATENTS

| | | | |
|---|---|---|---|
| 2,954,168 | 9/1960 | Maddox | 235—175 |
| 3,063,631 | 11/1962 | Ray | 235—92 |
| 3,165,647 | 1/1965 | De Bottari et al. | 307—88.5 |
| 3,185,859 | 5/1965 | Borkum | 307—88.5 |
| 3,210,559 | 10/1965 | Gabriel | 307—88.5 |

OTHER REFERENCES

Pages 104 to 107, 1955—Richards Arithmetic Operations in Digital Computers, D. Van Nostrand Co.

MALCOLM A. MORRISON, *Primary Examiner.*

M. P. HARTMAN, *Assistant Examiner.*